Patented Aug. 16, 1932

1,871,512

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

AZO-DYES DERIVED FROM NAPHTHYL-ARYL ETHERS

No Drawing. Application filed June 21, 1929. Serial No. 372,806.

The invention relates to so-called ice-colors or direct-developed dyestuffs which may be produced from diazo or polyazo components coupled into 2.3-hydroxy-naphthoic-acid arylides, the latter being formed by condensation of said acid with aminonaphthyl-aryl ethers or by some other equivalent means; more particularly to dyes prepared from such arylides derived from aminonaphthyl-phenyl ethers. The dyestuffs as above mentioned accordingly have the structure as illustrated probably by the following general formula:

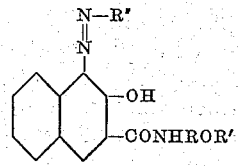

where R, R' and R'' represent naphthyl, aryl and diazotized amino-compound residues respectively, such residues being capable of further substitution.

It is known that azo dyes fast to light and washing are produced by coupling diazotized aromatic amines into naphthol AS, the latter being 2.3-hydroxynaphthoic acid anilide, or into related compounds. I have now discovered that aminonaphthyl-aryl ethers e. g. 1-amino-4-phenoxy-naphthalene, may be employed as arylide components, and furthermore that into arylides derived from such ethers and 2.3-hydroxynaphthoic acid by condensation or other suitable manner, may be coupled diazotized or polyazotized aromatic amino- or polyamino-compounds respectively, with the formation of useful azo-dyestuffs. The invention, then, consists of the steps and new products hereinafter fully described and particularly pointed out in the claims, the following description setting forth but several of the various ways in which the principle of the invention may be used.

The herein described new azo dyestuffs dye cotton and other fibers directly in a wide range of colors, varying from orange to purple in clear and brilliant tones. While they are best applied by developing on the fiber, they may also be produced in any of the ordinary ways e. g., prepared in substance or deposited upon suitable substrata to form lakes, in which forms they are useful pigments on account of their insolubility, stability and fastness. In other words, the respective reaction components may be brought together directly, with or without the aid of a diluting or solvent medium, the dye being separated from the reaction mixture by any suitable means. Auxiliary treatment, e. g. mordanting or after-treatment with metallic salts such as chromium, aluminum or copper salts for fixing the dye or modifying its color or tone, may be employed if desired in conjunction with the dyeing operation.

A preferred manner in which the invention may be carried out is illustrated in the following specific examples; it being understood, however, that such examples are not to be construed as a limitation upon the invention.

Example 1

The 2.3-hydroxynaphthoic acid arylide of 1-amino-4-phenoxy-naphthalene is prepared by condensing said acid and amine with the aid of phosphorus trichloride in the presence of toluene in the usual manner whereby the desired arylide forms as a solid phase intermixed with the liquid medium. The purified arylide has a melting point of 175° C.

Cotton yarn is impregnated with a slightly alkaline solution of the above arylide to which may be added advantageously, but not necessarily, formaldehyde and/or a fixative, e. g. Turkey red oil or an aluminum salt. Said yarn is then immersed in a diazo solution derived from p-amino-acetanilide. The dye develops on the fiber and has a violet red color, the probable formula being:

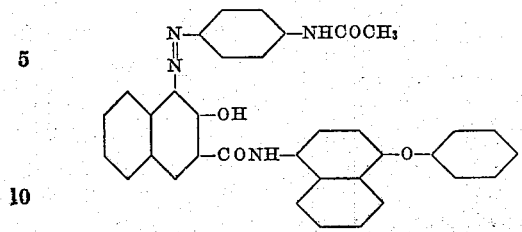

Example 2

In a manner similar to that described in Example 1, tetrazotized dianisidine is coupled into the same arylide, the dyestuff developing on the fiber, being of a blue color and having the probable formula:

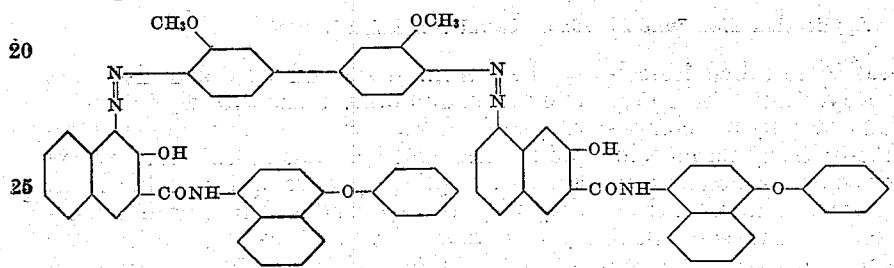

Example 3

Similarly, as above described, diazotized p-nitro-benzene-azo-toluidine is coupled into the aforementioned arylide. The dyestuff which develops on the fiber is reddish violet in color and has the probable formula:

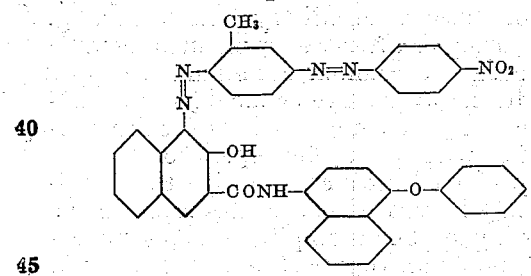

By similar procedure I have prepared other azo dyes as illustrated in the following table, wherein the first column indicates the amine of which the diazotized or polyazotized form was coupled into the above-mentioned arylide, and the second column the approximate color of the produced dye.

Table

| Amine | Color of dyestuff |
| --- | --- |
| m-nitraniline | Reddish orange |
| 1-4-amino-naphthol phenyl ether | Dark violet |
| o-chloro-p-nitraniline | Yellowish red |
| o-amino diphenyl ether | Reddish pink |
| alpha-naphthylamine | Reddish violet |
| 3-4-dichloroaniline | Orange red |
| o-nitrophenetidine | Violet |
| 4-4'-diamino-diphenyl ether | Carmine rose |
| benzidine | Reddish violet |
| p-chlorotoluene | Rose red |
| 2-methoxy-5-aminodiphenyl | Violet red |
| p-phenetole-azo-alpha-naphthylamine | Gray blue |
| m-nitrobenzene-azo-naphthylamine | Gray blue |

In the aforementioned examples, cotton was the particular fiber used, however, other natural or artificial fibers, e. g. silk or rayon may be employed without departing from the scope of this invention which is intended to embrace not only the herein described dyestuffs but materials dyed therewith.

Furthermore, dyestuff components other than those particularly above mentioned may be used, i. e. other diazotized or polyazotized aromatic mono- or polyamino-compounds may be utilized as diazo components for the purpose of coupling into the herein described arylides. It is understood that the intermediates herein mentioned may furthermore be either mono- or poly-substituted, e. g. by alkyl, halogen and/or nitro groups.

In short, my invention in its broader aspects scopes compounds of the herein described arylide type prepared from 2.3-hydroxynaphthoic acid and aminonaphthylaryl ethers by any suitable manner, and azo-dyes derived therefrom.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. In a process for the manufacture of new azo-dyes, the step which consists in coupling a 2.3-hydroxynaphthoyl-amino-naphthylphenyl ether having the probable general formula,

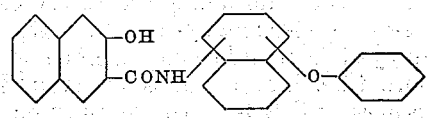

with a diazotized aromatic amino compound.

2. In a process for the manufacture of new azo-dyes, the step which consists in coupling 2.3-hydroxynaphthoyl-1'-amino-4'-phenoxy-naphthalene having probably the general formula

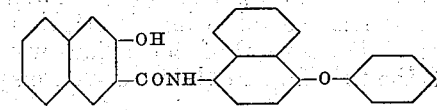

with a diazotized aromatic amino compound.

3. Azo-dyes having probably the general formula,

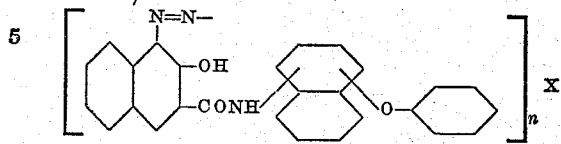

wherein X represents the residue from a diazotized aromatic amino compound, and $n$ is the number of diazo groups in the diazo component X.

4. Azo-dyes having probably the general formula,

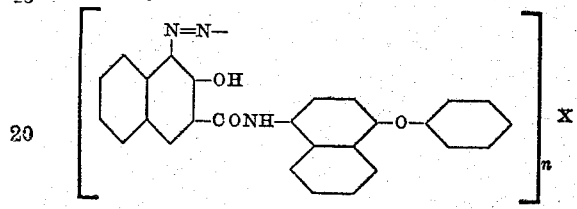

wherein X represents the residue from a diazotized aromatic amino compound, and $n$ is the number of diazo groups in the diazo component X.

5. Azo dyes having probably the general formula

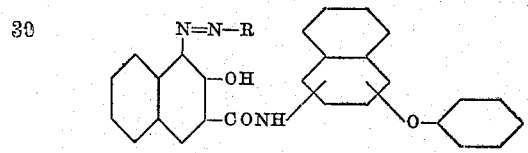

wherein R represents an aryl residue.

6. Azo dyes having probably the general formula

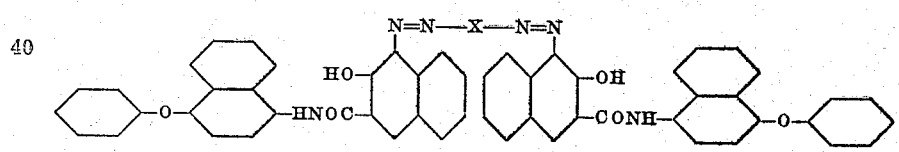

wherein X represents an aryl residue.

Signed by me this 18 day of June, 1929.

ERNEST F. GRETHER.